United States Patent
Stammberger et al.

(10) Patent No.: US 6,928,882 B2
(45) Date of Patent: Aug. 16, 2005

(54) METHOD AND DEVICE FOR DETERMINING THE TENSION OR THE TENSILE STRESS IN A METAL STRIP

(75) Inventors: Karl Stammberger, Erlangen (DE); Felix Türk, Regensburg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/169,184

(22) PCT Filed: Dec. 14, 2000

(86) PCT No.: PCT/DE00/04457
§ 371 (c)(1),
(2), (4) Date: Nov. 12, 2002

(87) PCT Pub. No.: WO01/47650
PCT Pub. Date: Jul. 5, 2001

(65) Prior Publication Data
US 2003/0121334 A1 Jul. 3, 2003

(30) Foreign Application Priority Data
Dec. 27, 1999 (DE) .......................... 199 63 183

(51) Int. Cl.⁷ ................................................ G01N 3/08
(52) U.S. Cl. ........................................................ 73/826
(58) Field of Search ..................... 73/862.451, 862.583, 73/862.07, 862.41, 826, 862.454, 160, 862.473; 254/134.3 FT

(56) References Cited

U.S. PATENT DOCUMENTS

| | | | |
|---|---|---|---|
| 3,850,031 A | 11/1974 | Schwenzfeier et al. | |
| 4,073,007 A | 2/1978 | Boivin | |
| 4,546,656 A * | 10/1985 | Grundy et al. ........... | 73/862.48 |
| 4,860,212 A * | 8/1989 | Uesugi ....................... | 346/472 |
| 4,928,538 A * | 5/1990 | Burdess et al. .......... | 73/862.41 |
| 5,878,933 A * | 3/1999 | Laughery .................... | 226/21 |
| 6,079,261 A * | 6/2000 | Makela ........................ | 73/160 |
| 6,357,301 B1 * | 3/2002 | Berghs et al. ......... | 73/862.451 |

FOREIGN PATENT DOCUMENTS

DE          19803260          1/1998

* cited by examiner

Primary Examiner—Max Noori
Assistant Examiner—Octavia Davis
(74) Attorney, Agent, or Firm—Baker Bott LLP

(57) ABSTRACT

A method and device for determining the tension, or tensile stress in a metal strip between two bearing points, e.g., between two roll stands, between a roll stand and a coiler, in a breakdown stand, or in front of, or behind a deflection roll. The excursion of the metal strip is measured, and the natural frequency of the metal strip is determined on the basis of the excursion of the metal strip.

14 Claims, 4 Drawing Sheets

METHOD AND DEVICE FOR DETERMINING THE TENSION OR THE TENSILE STRESS IN A METAL STRIP

CROSS-REFERENCE TO RELATED APPLICATIONS

This is a national application for International Application No. PCT/DE00/04457 which was filed on Dec. 14, 2000 and which published in German on Jul. 5, 2001, which in turn claims priority from 199 63 183.2, which was filed on Dec. 27, 1999, of which the following is a of which the following is a

FIELD OF THE INVENTION

The invention relates to a device and a method for determining the tensile stress, or the strip tension in a metal strip between two bearing points, for example between two roll stands, between a roll stand and a coiler, between a roll stand and a deflection roll, between two deflection rolls, or between the rolls in a stretching and tension-leveling unit, with sensors for measuring the oscillation of the metal strip.

BACKGROUND OF THE INVENTION

The use of a deflection roll which is arranged between a roll stand and a coiler, and over which a metal strip is passed, is known in the art. Located under the bearings of the deflection roll are force sensors, which measure the bearing forces. The forces acting in the direction of the strip are determined from the bearing force components, and the deflection angle. In the case of small strip tensions, and small deflection angles, the system is severely afflicted by errors, since the measuring errors of the small forces and small deflection angles that are measured lead to considerable errors in the conversion to the strip tension.

It is also known to measure the torque which acts in the drive train between the coiler drum and the motor shaft. A problem arises in this case since the large measuring range of the strip tension is further extended by the possible ratio between maximum and minimum coil radius. Here, too, errors can be great in the case of a small strip tension and a small coil diameter and accuracy requirements come at a high price.

Like other measuring methods, both of the aforesaid methods have several sources of error, which ultimately can lead to measuring errors having an order of magnitude of 1 to 2% in relation to the measuring range end value. In particular in the case of rolling thin-end thicknesses on reversing roll stands (for example foil roll stands), the ratio of maximum to minimum strip tension between the roll stand and the coiler at a stand may be of an order of magnitude of 50. Taking into account the requirement that, even with minimal strip tension, a measuring accuracy of at least 10% of the strip tension at the time must be achieved, the limits of feasible industrial measuring technology are reached, since, if even just tolerable errors are related to the maximum strip tension, or the still higher measuring range end value, the relative measuring error under the conditions can only be of the order of magnitude of 1%.

SUMMARY OF THE INVENTION

The object of the present invention is to overcome the aforesaid disadvantages in the prior art and, in particular, to provide a measuring method which ensures a significant improvement in the measuring accuracy, particularly where small strip tensions exist.

In determining the tensile stress, or the tension in a metal strip between two bearing points, for example between two roll stands, etc., the oscillation of the strip is measured perpendicularly to the plane of the strip, and used to determine one or more natural frequencies of this oscillation of the metal strip. The novel device for effecting this method comprises a distance sensor for measuring the oscillation of the metal strip, and a frequency analyzer for determining one or more natural frequencies of the oscillation of the metal strip perpendicularly to the plane of the strip on the basis of the excursion of the metal strip. In this way, a particularly precise determination of the strip tension, or the tensile stress in the metal strip is possible, particularly even in the case of small strip tensions.

In a preferred embodiment of the present invention, the natural frequency of the metal strip between the two bearing points, for example between two roll stands, etc., is determined, in particular by means of a frequency analyzer, by determining a dominant frequency of an oscillation of the metal strip.

In another preferred embodiment of the invention, the calculation of the tension, or the tensile stress in the metal strip takes place by means of a tension calculator, on the basis of the natural frequency of the metal strip.

In still another preferred embodiment, the tensile stress in the metal strip is determined according to the equation: $\sigma = 1^2 c \rho f^2$, where 1 is the length of the metal strip between the two bearing points, i.e., between two roll stands, between the roll stand and the coiler, in the breakdown stand or in front of or behind the deflection roll; c is a constant; $\rho$ is the density of the metal strip; and f is the natural frequency of the metal strip.

In a further preferred embodiment of the present invention, the tension s in the metal strip is determined according to the equation: $s = 1^2 c \rho h b f^2$, where 1 is the length of the metal strip between the two bearing points, i.e., between two roll stands, between the roll stand and the coiler, in the breakdown stand or in front of or behind the deflection roll; c is a constant; $\rho$ is the density of the metal strip; h is the thickness of the metal strip; b is the width of the metal strip; and f is the natural frequency of the metal strip.

In a further preferred embodiment, the excursion of the metal strip is measured, in particular by means of excursion sensors, at different points of the metal strip, viewed in the transverse direction of the metal strip.

In still another preferred embodiment of the invention, at least $$3 \frac{b}{1}$$

excursion sensors are provided for measuring the excursion of the metal strip wherein 1 is the length of the metal strip between two roll stands, between the roll stand and the coiler, in the breakdown stand or in front of or behind the deflection roll; and b is the width of the metal strip. The excursion sensors are arranged in such a way that they measure the excursion of the metal strip at different points of the metal strip, viewed in the transverse direction of the metal strip. In this case, In a further preferred embodiment of the invention, the at least two excursion sensors are arranged so that they measure the excursion of the metal strip at least every 50 cm, viewed in the transverse direction of the metal strip.

In a further preferred embodiment of the invention, the sensors or the sensor line is/are arranged in the longitudinal direction of the strip, preferably at the points of the maximum amplitude of the form of oscillation assigned to the natural frequency concerned, i.e. at ½ in relation to the first natural frequency, at ¼ in relation to the second natural frequency, etc.

In a further preferred embodiment of the invention, the tension in the metal strip is determined from measured values determined by at least two excursion sensors, in particular by means of an averaging unit.

In a further preferred embodiment, a deflection roll is provided for deflecting the metal strip.

In a further preferred embodiment, an excursion device is provided for the periodic excursion of the metal strip, i.e. in particular for producing a flexural wave, in particular a flexural wave in the longitudinal direction of the metal strip.

In a further preferred embodiment, the excursion device makes the metal strip undergo an excursion with a frequency which lies in the range of the natural frequency.

In yet a further preferred embodiment of the invention, a controller is provided for controlling the excursion device on the basis of a value determined by means of the excursion sensor.

BRIEF DESCRIPTION OF THE DRAWINGS

Further details and advantages of the present invention are disclosed hereinbelow in connection with exemplary embodiments, and drawings, in which.

DETAIL DESCRIPTION OF THE INVENTION

Figure 1:
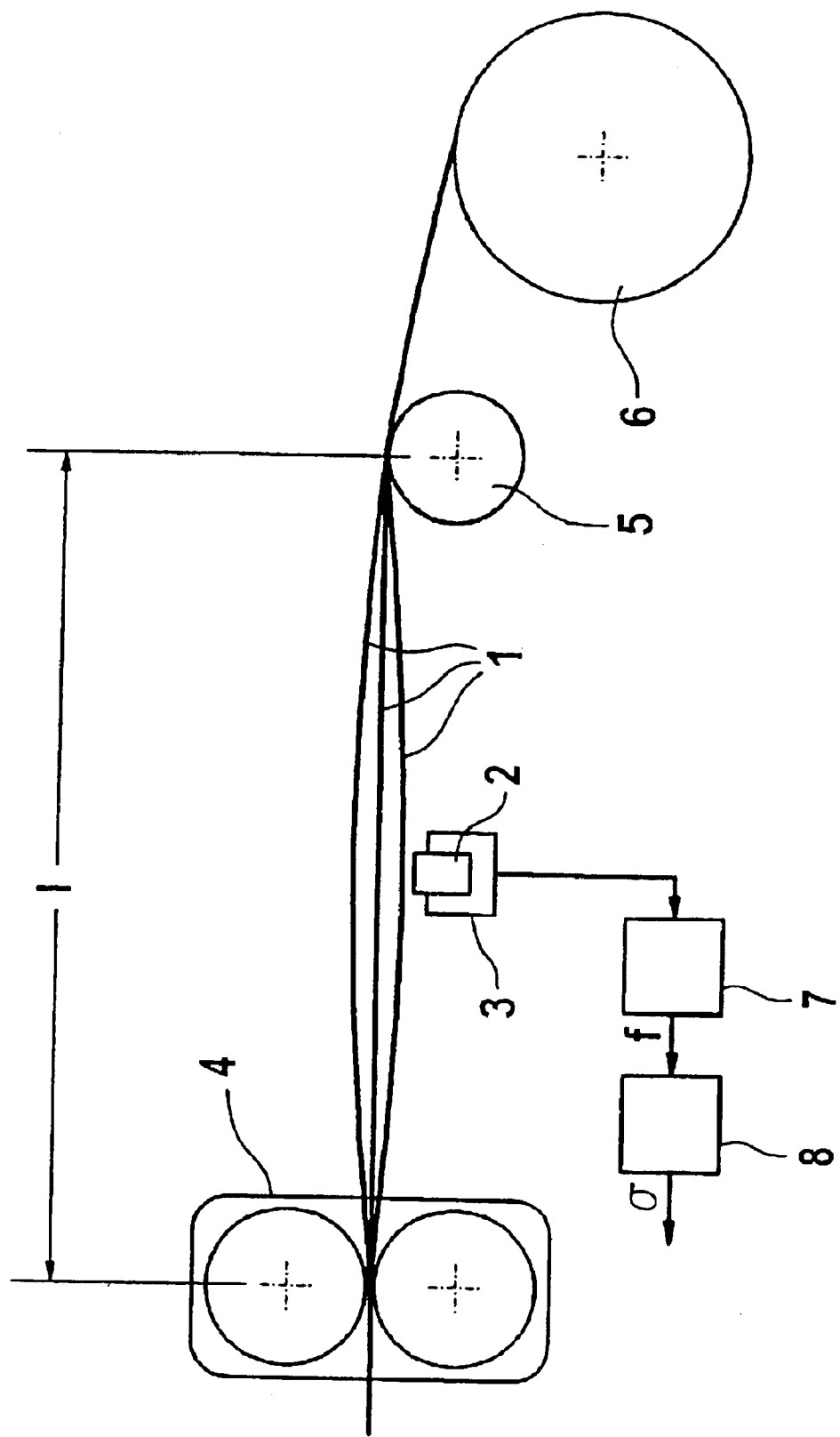
FIG. 1 illustrates a device for determining the tension or the tensile stress in a metal strip.

FIG. 1 shows a device for determining the tension s, or the tensile stress σ in a metal strip 1, that runs out of a roll stand 4, and is wound up onto a coiler 6. Arranged between the roll stand 4 and the coiler 6 is a deflection roll 5. Between the roll stand 4 and the deflection roll 5, the metal strip 1 oscillates or vibrates. This is represented by the three lines denoted by the number 1, which indicate the metal strip. Provided underneath the metal strip 1 is an excursion sensor 2. The excursion sensor 2 may also be arranged above the metal strip 1. By means of the excursion sensor 2, the excursion of the metal strip 1 between the roll stand and the deflection roll 5 is sensed and transmitted to a frequency analyzer 7. The frequency analyzer 7 determines, for example by an FFT, the frequency spectrum of the measuring signal supplied by the excursion sensor 2. From the frequency spectrum, the frequency analyzer 7 determines the dominant fundamental oscillations, and outputs them as the natural frequency f of the metal strip 1 between the roll stand 4, and the deflection roll 5. The natural frequency f of the metal strip 1 between the roll stand 4 and the deflection roll 5 is the input variable in a tension calculator 8.

The tension calculator 8 determines the tensile stress in the metal strip 1 according to the equation: $\sigma = l^2 c\rho f^2$, where l is the length of the metal strip 1 between the roll stand 4 and the deflection roll 5; c is a constant; ρ is the density of the metal strip 1; and f is the natural frequency of the metal strip 1 between the roll stand 4 and the deflection roll 5.

It is also possible that, instead of (or in addition to) calculating the tensile stress σ, the tension calculator 8 calculates the tension 5 in the metal strip 1. In this case, the tension calculator determines the tension s in the metal strip 1 according to the equation: $\sigma = l^2 c\rho hbf^2$, where h is the thickness of the metal strip 1; b is the width of the metal strip 1 (cf. FIG. 2); and c,ρ,f, are as stated above.

Figure 2:
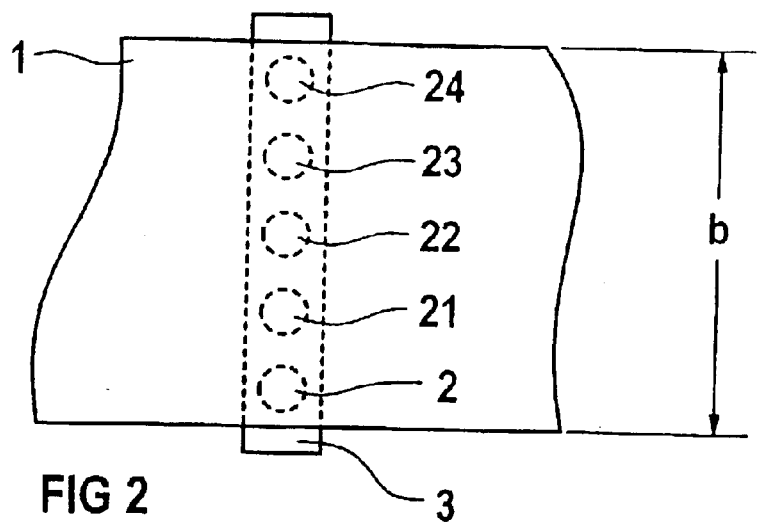
FIG. 2 illustrates an arrangement of excursion sensors on a measuring bar.

In a preferred embodiment of the device for determining the tension s, or the tensile stress a in the metal strip 1, the excursion sensor 2 is part of a measuring bar 3. The measuring bar 3 preferably has a number of excursion sensors 2, 21, 22, 23 and 24, as shown in FIG. 2 which shows a plan view of the metal strip 1.

A measuring bar preferably has at least n excursion sensors for measuring the excursion of the metal strip, where $$n \geq 3\frac{b}{l}$$

Figure 3:
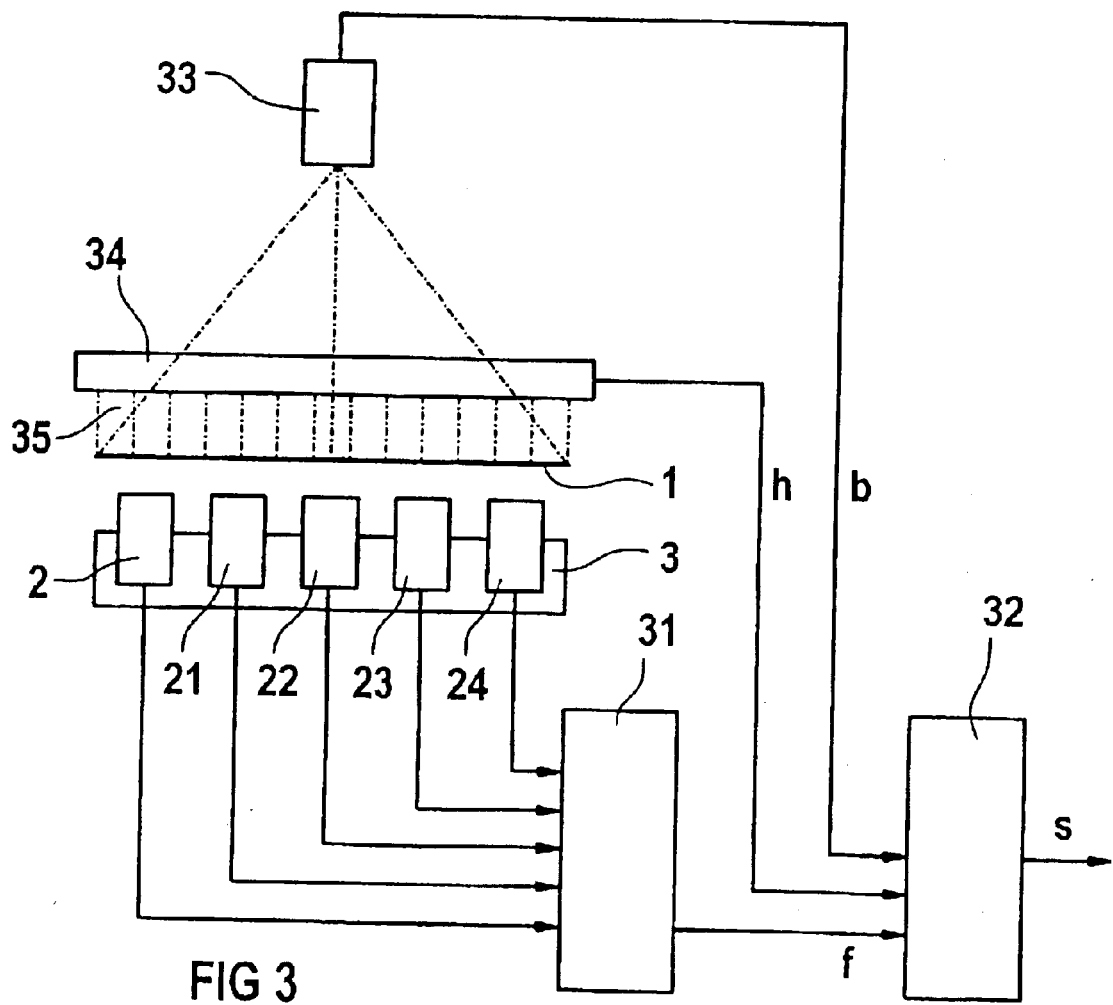
FIG. 3 illustrates an alternative device for determining the tension or the tensile stress in a metal strip.

FIG. 3 shows a particularly preferred embodiment of a device for determining the tension s, or the tensile stress in a metal strip 1. Here the metal strip 1 is represented in cross section. The measuring signals of the excursion sensors 2, 21, 22, 23 and 24, which are part of a measuring bar 3, are evaluated in a frequency analyzer 31. The frequency analyzer 31 forms spectral analyzes of the measuring signal determined by the excursion sensors 2, 21, 22, 23 and 24, determines their dominant fundamental frequency, and forms an average value from the individual dominant fundamental frequencies. This average value is output as the natural frequency f. A frequency analyzer 7 according to FIG. 1 is designed in the same way if it evaluates the signals of a number of sensors.

In a preferred embodiment, a width measuring device 33 is provided for measuring the width b at the time of the metal strip 1, and a thickness measuring device 34 is provided to measure the thickness h while the metal strip 1 is in various measuring zones 35. The natural frequency f, the thickness h of the metal strip 1, and the width b of the metal strip 1 are input variables in a tension calculator 32. The tension calculator calculates the tensions and/or the tensile stress σ in a way analogous to the tension calculator 8 in FIG. 1.

In a farther preferred embodiment, instead of the one natural frequency f, the frequency analyzer 31 outputs the dominant fundamental frequencies in the measured values of the individual excursion sensors 2, 21, 22, 23, 24. In this embodiment, the individual significant fundamental frequencies are converted by means of the tension calculator 32 into associated tensile stresses σ, and these are used to form an average value of the tensile stress with the aid of an averaging unit. The average value of the tensile stress, and the tension s derived from it, are output.

Figure 4:
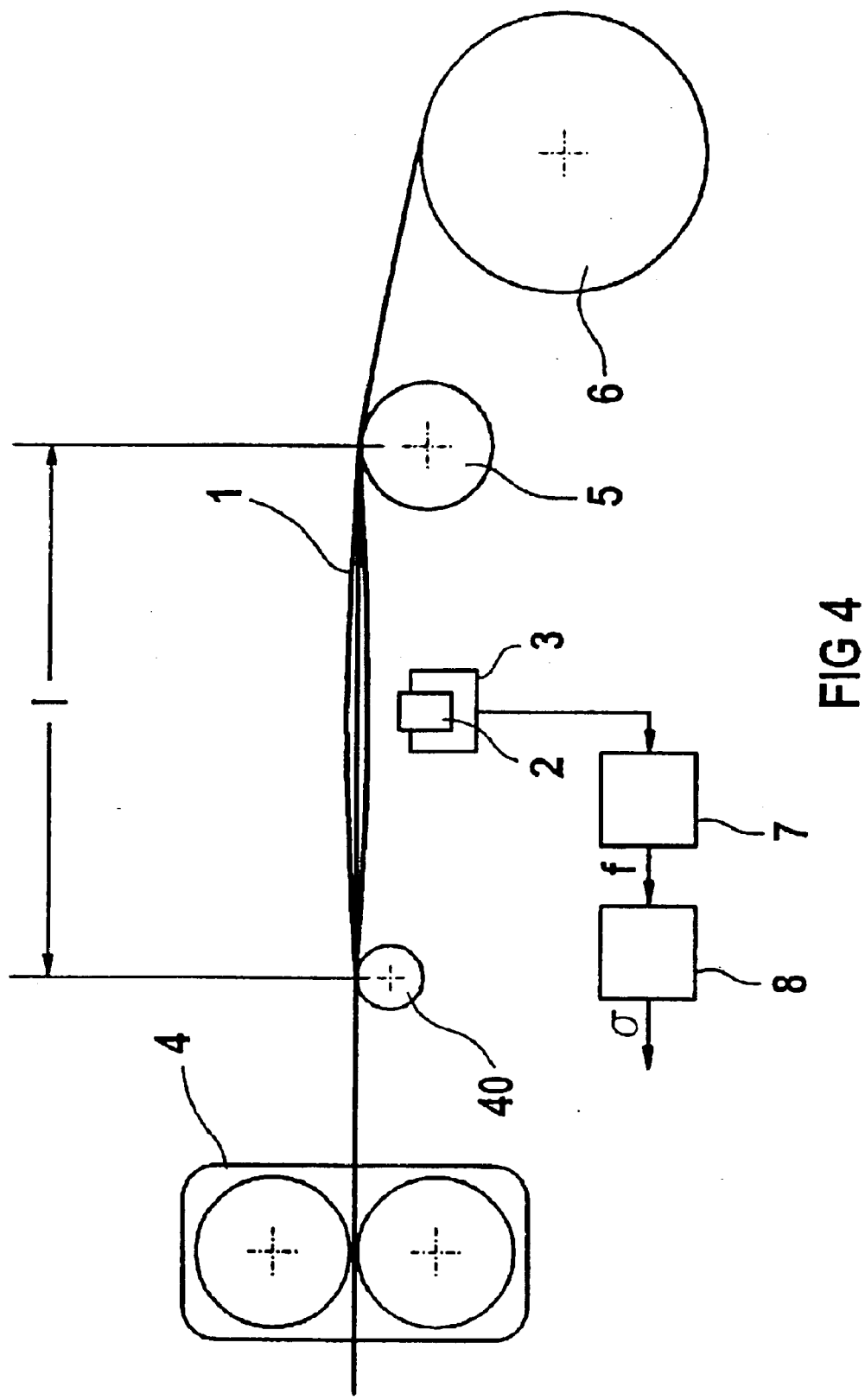
FIG. 4 illustrates a further alternative device for determining the tension or the tensile stress in a metal strip.

FIG. 4 shows a further advantageous embodiment of the present invention, and a device for measuring the tension s or the tensile stress σ in a metal strip 1. For this purpose (in comparison with the embodiment in FIG. 1) an additional deflection roll 40 is provided between the excursion sensor 2 and the roll stand 4. The excursion sensor 2 measures the excursion of the metal strip 1 between the deflection roll 40 and the deflection roll 5. This measure has the effect of reducing the length 1 of the freely oscillating part of the metal strip 1. This shorter, freely oscillating part of the metal strip 1 has a higher natural frequency f, which results in the natural frequency f being determined more quickly.

Figure 5:
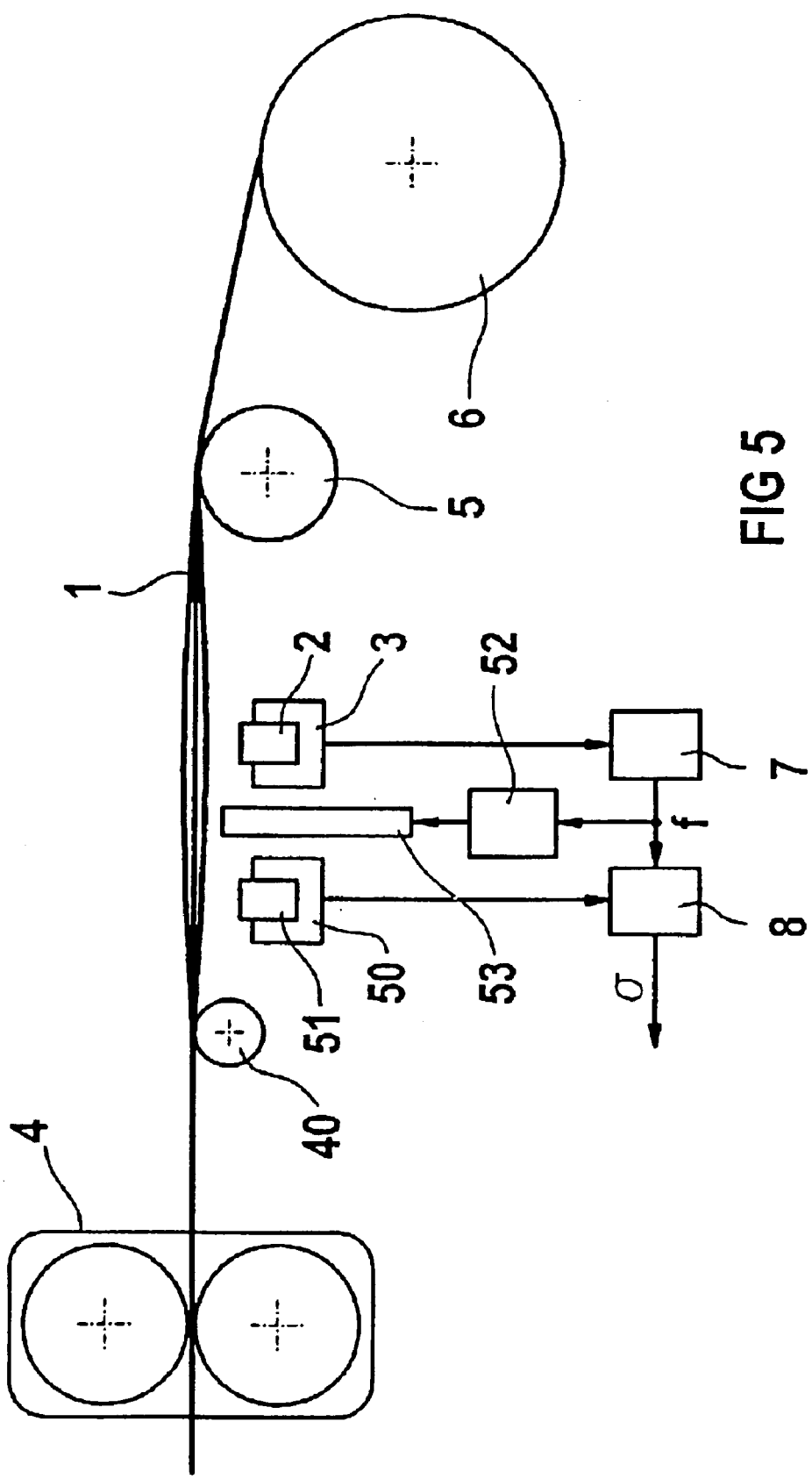
FIG. 5 illustrates a still further alternative device for determining the tension or the tensile stress in a metal strip.

FIG. 5 shows a further preferred embodiment of a device for determining the tension s or the tensile stress σ in a metal strip 1. This embodiment has an excursion device 53, which imposes an excursion on the metal strip 1. A particularly preferred embodiment of such an excursion device is disclosed in DE 198 03 260 A1. FIG. 5 shows the use of the excursion device 53 in conjunction with the embodiment according to FIG. 4. The excursion device may, however, also be used in conjunction with the other embodiments. The excursion device 53 causes the metal strip 1 to undergo a periodic excursion, the frequency of the periodic excursion lying in the vicinity of the natural frequency f of the metal strip 1 between the deflection rolls 5 and 40. In another preferred embodiment, a controller 52 is provided which controls the excursion device 53 on the basis of the natural frequency f determined by the frequency analyzer in such a way that the periodic excursion takes place by the excursion sensor 53 with the determined natural frequency f. In a particularly preferred embodiment, the excursion device 53 and the excursion sensor 2 are both part of a device for measuring the tensile stress distribution in the metal strip 1, as disclosed in DE 198 03 260 A1. In still another preferred embodiment, a further excursion sensor 51 is provided, which is arranged in the longitudinal direction of strip 1, and may be part of a measuring bar 50.

What is claimed is:

1. A device for determining tensile stress and/or tension in a metal strip between two bearing points, comprising an excursion sensor for measuring oscillation of the metal strip perpendicularly to the metal strip's plane, and a frequency analyzer comprising a frequency spectrum derived by a Fast Fourier Transformation of a measured oscillation of the metal strip for determining the metal strip's natural frequency by means of the metal strip's dominant frequency, and further comprising an excursion device for period i.e. excursion of the met al strip and a controller for controlling the excursion device based on a value determined by the excursion sensor.

2. The device according to claim 1, wherein the frequency analyzer determines the natural frequency of the metal strip between two bearing points selected from the following, between two roll stands, between a roll stand and a coiler, in a breakdown stand, or in front of, or behind a deflection roll, by determining a dominant frequency of an oscillation of the metal strip.

3. The device according to claim 1, further comprising a calculator for calculating the tension, or the tensile stress in the metal strip on the basis of a natural frequency of the metal strip.

4. The device according to claim 3, wherein the calculator determines the tensile stress in the metal strip according to the equation: $\sigma = l^2 c \rho f^2$, where l is the length of the metal strip between the two roll stands, between the roll stand and the coiler, in the breakdown stand, or in front of or behind the deflection roll; c is a constant; $\rho$ is the density of the metal strip; and f is the natural frequency of the metal strip.

5. The device according to claim 3, wherein the calculator determines the tension s in the metal strip according to the equation: $s = l^2 c \rho h b f^2$, where l is the length of the metal strip between the two roll stands, between the roll stand and the coiler, in the breakdown stand, or in front of, or behind the deflection roll; c is a constant; $\rho$ is the density of the metal strip; h is the thickness of the metal strip; b is the width of the metal strip; and f is the natural frequency of the metal strip.

6. The device according to claim 1, further comprising at least two excursion sensors for measuring an excursion of the metal strip, said excursion sensors being arranged in such a way that they measure the excursion of the metal strip at different points of the metal strip, viewed in a transverse direction of the metal strip.

7. The device according to claim 6, wherein the number of excursion sensors is $$3\frac{b}{l},$$

where l is the length of the metal strip between the two roll stands, between the roll stand and the coiler, in the breakdown stand, or in front of, or behind the deflection roll; and b is the width of the metal strip.

8. The device according claim 6, wherein the excursion sensors are arranged so that they measure the excursion of the metal strip at least every 50 cm, viewed in the transverse direction of the metal strip.

9. The device according to claim 6, wherein tensile stress is determined from measured values determined by the at least two excursion sensors using an averaging unit.

10. The device according to claim 1, further comprising a deflection roll for deflecting the metal strip.

11. The device according to claim 1, wherein the excursion device the metal strip to undergo an excursion with a frequency which lies in the range of the natural frequency.

12. The device according to claim 1, further comprising excursion sensors arranged in a longitudinal direction along the metal strip at the points of maximum amplitude of a characteristic form of oscillation of the natural frequency used for a stress determination.

13. A method for determining tension, or the tensile stress in a metal strip between two bearing points selected from the group consisting of: between roll stands, between a roll stand and a coiler, in a breakdown stand, or in front of, or behind a deflection roll, comprising using a device according to claim 1, measuring an excursion of the metal strip, and determining the natural frequency of the metal strip based on the excursion of the metal strip.

14. The method according to claim 13, further comprising determining the natural frequency of the metal strip with the aid of a maximum amplitude which occurs in an analysis of a natural frequency range.

* * * * *